United States Patent [19]

Galbi et al.

[11] Patent Number: 4,901,270

[45] Date of Patent: Feb. 13, 1990

[54] FOUR-TO-TWO ADDER CELL FOR PARALLEL MULTIPLICATION

[75] Inventors: David Galbi, Mountain View; Alfred K. Chan, San Jose, both of Calif.

[73] Assignee: Intel Corporation, Santa Clara, Calif.

[21] Appl. No.: 248,797

[22] Filed: Sep. 23, 1988

[51] Int. Cl.$^4$ ........................... G06F 7/50; G06F 7/52
[52] U.S. Cl. ........................... 364/786; 364/759
[58] Field of Search ........................ 364/759, 784, 786

[56] References Cited

U.S. PATENT DOCUMENTS

| 3,515,344 | 6/1970 | Goldschmidt et al. | 364/786 |
| 4,270,167 | 5/1981 | Koehler et al. | 364/200 |
| 4,338,675 | 7/1982 | Palmer et al. | 364/748 |
| 4,484,259 | 11/1984 | Palmer et al. | 364/754 |

OTHER PUBLICATIONS

Lai et al., *Logic Networks of Carry-Save Adders*, IEEE Trans. on Computers, vol. C-31, No. 9, Sep. 1982, pp. 870-882.

Singh et al., *Multiple Operand Addition and Multiplication*, IEEE Trans. on Computers, vol. C-22, No. 2, Feb. 1973, pp. 113-120.

Shen et al., "4-2 Carry-Save Adder Implementation Using Sand Circuits", IBM Tech. Disclosure Bull., vol. 20, No. 9, Feb. 1978, pp. 3594-3597.

Weinberger, "4-2 Carry-Save Adder Module", IBM Tech. Disclosure Bull., vol. 23, No. 8, Jan. 1981, pp. 3811-3814.

"IEEE Standard for Binary Floating-Point Arithmetic", Std 754-1985 Aug. 12, 1986.

"A Suggestion for a Fast Multiplier"; Wallace; IEEE Transactions on Electronic Computers, Feb. 1964; pp. 14-17.

"Recursive Implementation of Optimal Time VLSI Integer Multipliers"; Luk et al.; BLSI 1983; pp. 155-168.

"Introduction to Arithmetic for Digital Systems Designers"; Waser et al., 1982; Chapter 4.

*Primary Examiner*—Gary V. Harkcom
*Assistant Examiner*—Tan V. Mai
*Attorney, Agent, or Firm*—Blakely, Sokoloff, Taylor & Zafman

[57] ABSTRACT

A four-to-two adder for adding four numbers and generating two numbers which has the same sum as the sum of the four input numbers is used to add partial products in a multiplier. A plurality of adder cells are arranged in parallel to process corresponding bits of the four numbers. Each adder cell couples three of the four input bits to the next stage. A four-bit parity circuit is used to control two multiplexers which select signals from a carry generator and the one input signal which is not coupled to the subsequent adder cell stage to provide two output bits corresponding to the two output numbers.

5 Claims, 4 Drawing Sheets

FIG_1 (PRIOR ART)
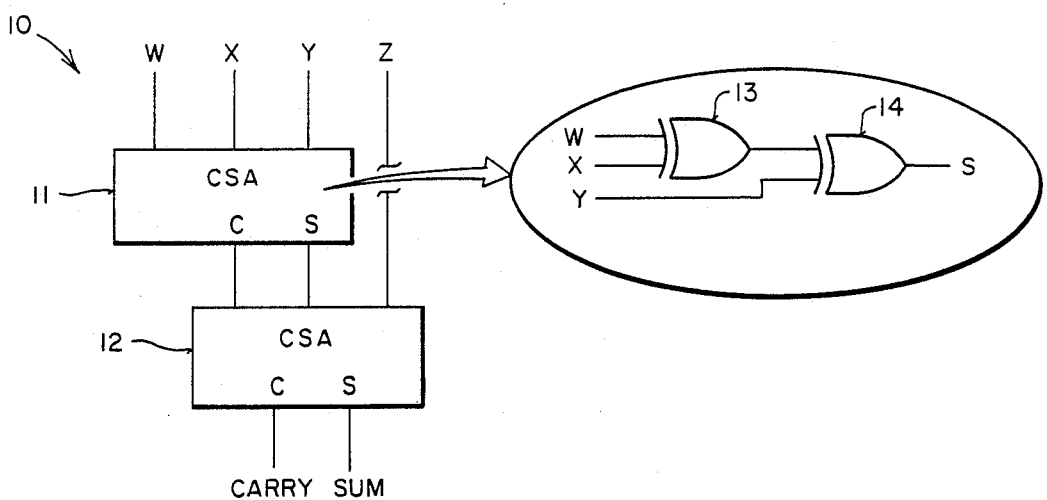
FIG_2 (PRIOR ART)
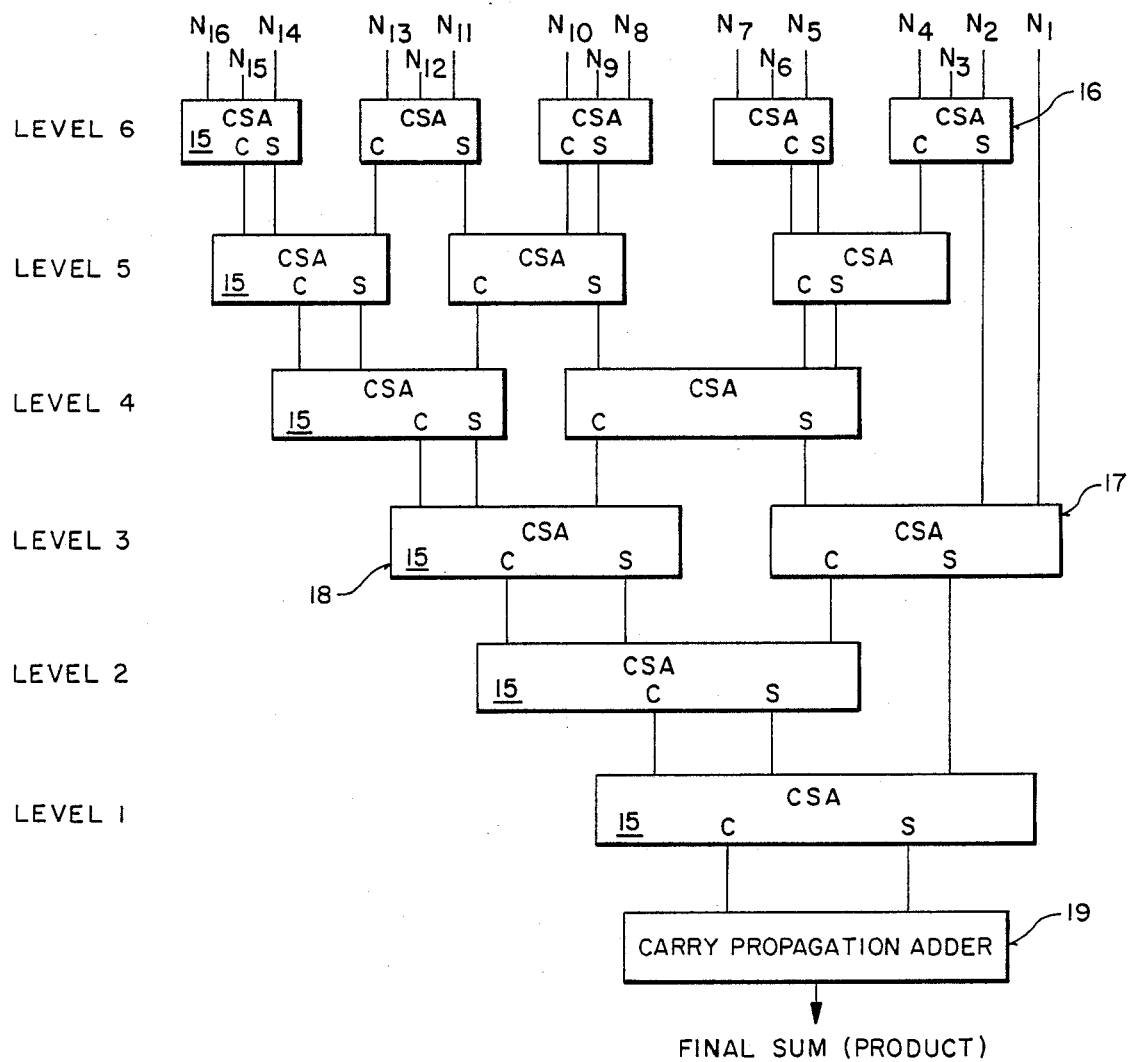

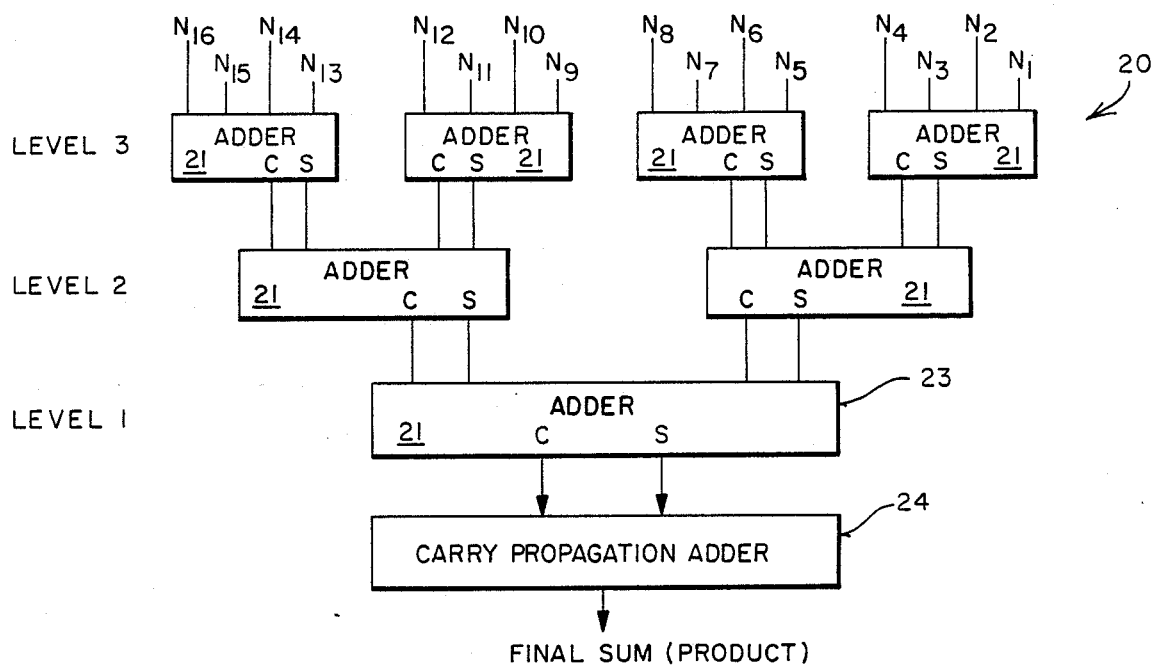
FIG_3 (PRIOR ART)
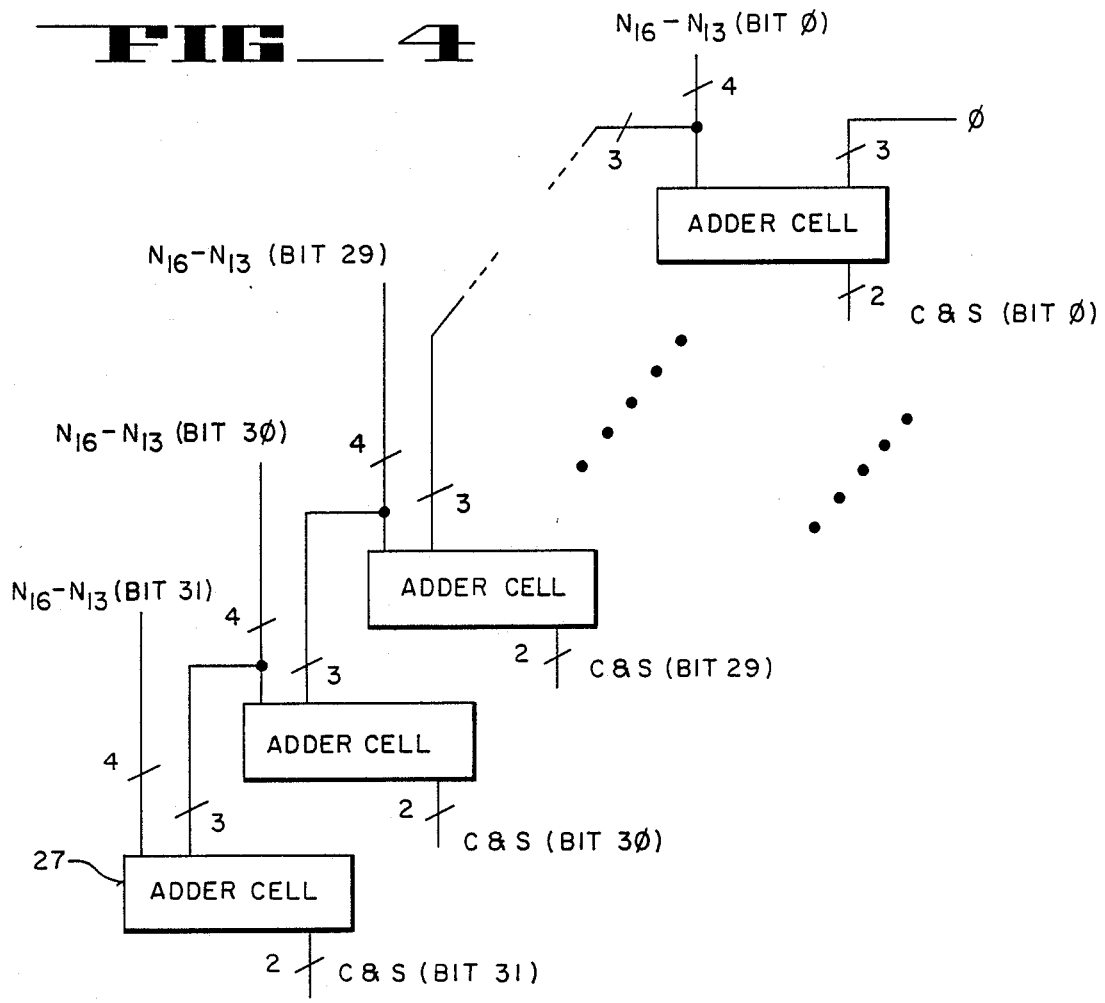
FIG_4

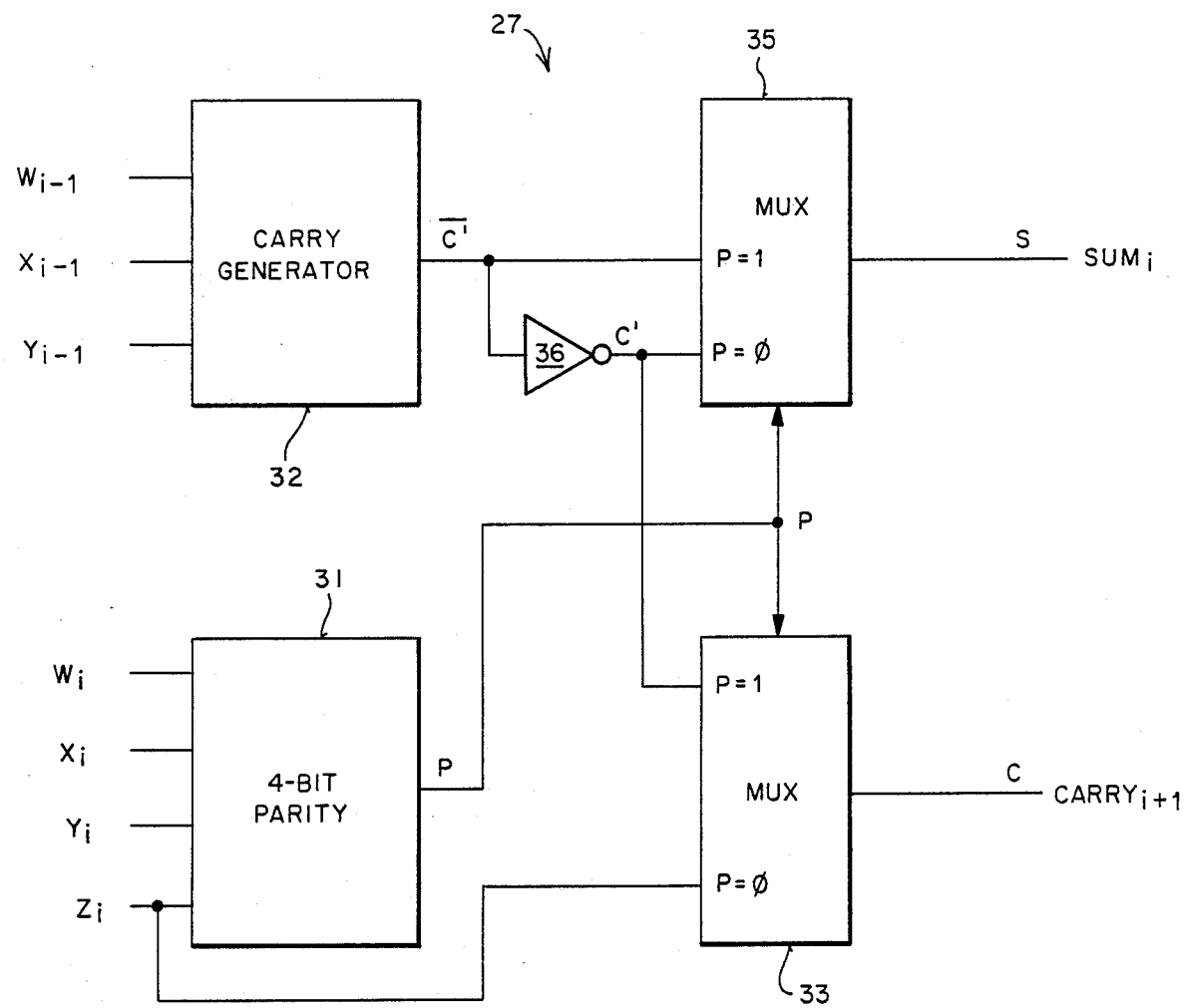
FIG_5

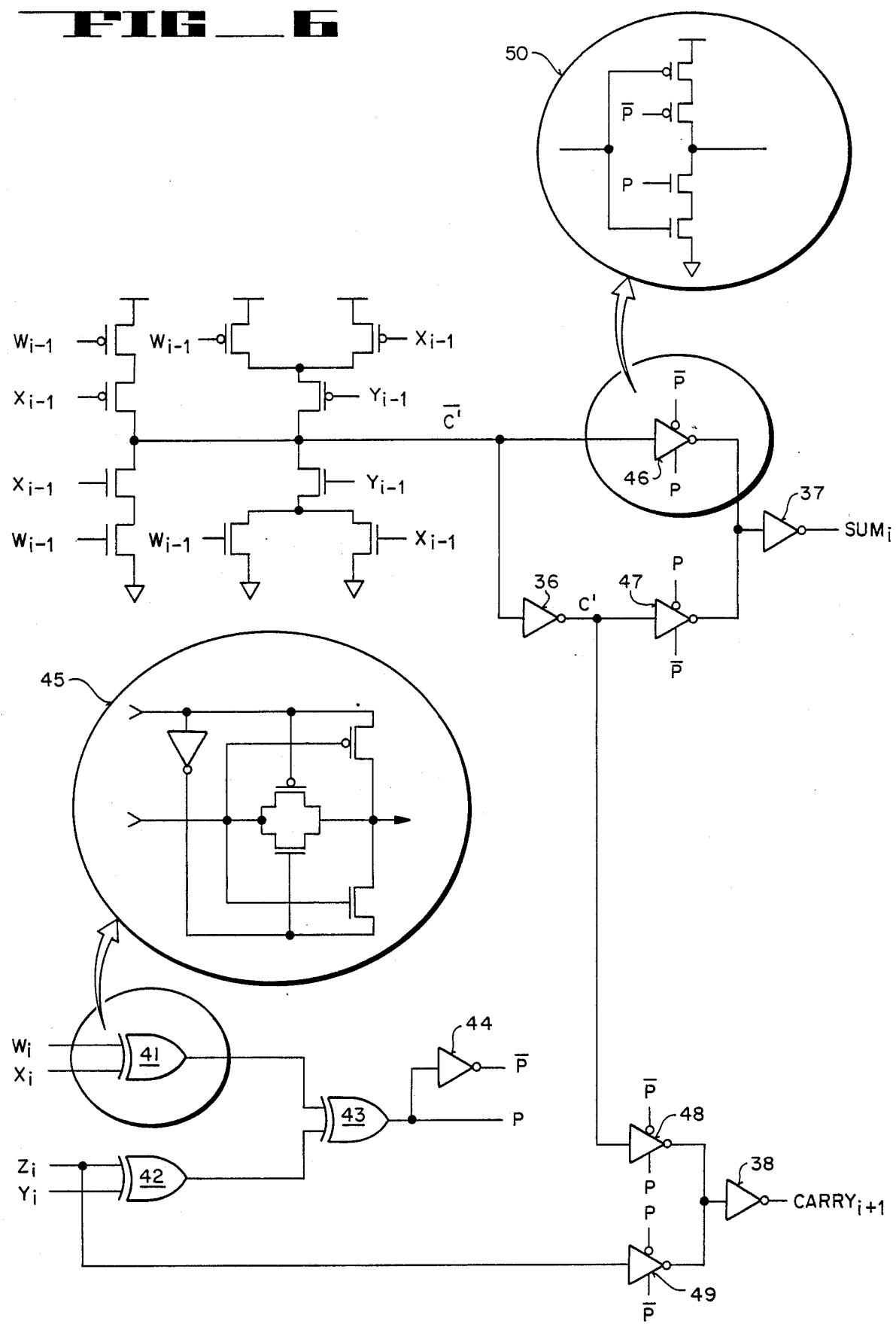
FIG_6

FOUR-TO-TWO ADDER CELL FOR PARALLEL MULTIPLICATION

BACKGROUND OF THE PRESENT INVENTION

1. Field of the Invention

The present invention relates to the field of digital multipliers and more specifically to the addition of partial products.

2. Prior Art

The heart of any computer or microprocessor system is the processor itself. One primary function of any processor is its ability to perform arithmetic or logic operations on various inputs to the processor. Various schemes are known in the prior art to provide arithmetic and logic operations in the arithmetic-logic unit (ALU) of a processor. One necessary function inherent in most processors is the ability to multiply two numbers. The numerical operation of multiplying a multiplicand by a multiplier to derive a product of the two numbers is well-known in the prior art.

Increasing the speed of the multiplier is especially important when the multiplier is on the same integrated circuit as the processor, because the time needed to perform the multiply, rather than the inter-chip communication time, is the dominant delay. Any reduction in the computation time of multiplying two numbers significantly improves the speed of the processor.

Various schemes have been devised to derive the product of two numbers. One of the faster prior art schemes for calculating a product of two numbers uses a Wallace Tree. However, because the pure form of a Wallace Tree is difficult to implement in a semiconductor device, variation to the Wallace Tree were derived to achieve a more regular layout for designing of semiconductor devices. These Wallace Tree variations provide a more regular layout which lends itself to the design of integrated circuits, but at times may be slower in performance to the pure Wallace Tree technique. Trade-offs exist between speed of operation and difficulty of device construction. The prior art references cited below describe some of the prior art techniques for implementing a multiplication scheme which is conducive to the design of numerical processors.

A typical multiplication operation as currently implemented in numerical processors can be divided into three steps. The first step involves the generation of all of the partial products at substantially the same time. The second step involves reducing the partial products to two numbers which have the same sum as the sum of the partial products. Finally in the third step, the two numbers from the second step are added to derive the product. Any improvement in the speed of performing any of the above described three steps will necessarily result in the improved speed of the total multiplication operation. The present invention provides for a faster adder cell which is used in performing the above-described step to reduce the partial products to two numbers.

PRIOR ART REFERENCES

1. "A Suggestion for a Fast Multiplier"; C. S. Wallace; IEEE Transactions on Electronic Computers, Feb. 1964; pages 14–17.

2. "Recursive Implementation of Optimal Time VLSI Integer Multipliers": W. K. Luk and J. E. Vuillemin; VLSI 1983; pages 155–168.

3. Introduction to Arithmetic for Digital Systems Designers; Shlomo Waser and Michael Flynn; 1982; Chapter 4.

SUMMARY OF THE PRESENT INVENTION

The present invention describes an adder for performing four-to-two addition. For each adder, a plurality of adder cells are arranged in parallel, wherein each adder cell accepts corresponding bits of four numbers that are to be added. Two outputs which have the same sum as the sum of the four inputs are provided from each adder. As used in the preferred embodiment the adder is used to add partial products as a second step of a three-step multiplication scheme.

Each adders cell's four input bits are coupled to a parity circuit which provides an exclusive OR'ing of the inputs. Three of the four inputs are coupled to a subsequent adder cell stage. The three inputs from the previous adder cell stage to the current adder stage are coupled as inputs to a carry generation circuit which generates a carry. This carry and its complement are provided as inputs to a first multiplexer. The carry and the one input which is not coupled to the next adder cell stage are coupled as inputs to a second multiplexer. The parity output from the four-bit parity circuit controls the selection of each of the pairs of inputs to the two multiplexers. The outputs of the two multiplexer are the two outputs of the adder cell.

BRIEF DESCRIPTION OF THE DRAWINGS

FIG. 1 is a prior art adder circuit for providing four-to-two addition.

FIG. 2 is a prior art Wallace Tree for adding sixteen numbers.

FIG. 3 is a prior art tree structure for adding sixteen numbers by using the
four-to-two adders of FIG. 1.

FIG. 4 is a block diagram showing an arrangement of the plurality of four-to-two
adder cells of the present invention.

FIG. 5 is a block diagram of the adder cell of FIG. 4.

FIG. 6 is a circuit schematic diagram showing the preferred embodiment of the adder cell of FIG. 5.

DETAILED DESCRIPTION OF THE INVENTION

A four-to-two adder cell for improving the speed of performing a multiplication operation is described. A prior art technique is discussed first to establish the foundation upon which the present invention is based. In the following description, numerous specific details are set forth such as specific circuits, etc., in order to provide a thorough understanding of the present invention. It will be obvious, however, to one skilled in the art that the present invention may be practiced without these specific details. In other instances, well-known structures have not been described in detail in order not to unnecessary obscure the present invention.

PRIOR ART

Referring to FIG. 1, a prior art adder circuit 10 for adding four numbers is shown. Two carry-save adders (CSA) 11 and 12 are coupled in sequence to provide a carry and a sum output. The purpose of circuit 10 is to reduce the partial products to two numbers that have the same sum as the sum of the partial products. That is, the carry output and the sum output from CSA 12 provide the two numbers that have the same sum as the sum of the partial products W, X, Y and Z.

Because the prior art CSA circuits are designed to operate on three numbers, numbers W, X and Y are provided as input to CSA 11. The output of CSA 11 is comprised of a carry and sum outputs (C and S). CSA 11 reduces the partial products W, X and Y to two numbers, C and S, that have the same sum as the sum of the partial products W, X, and Y. The S output represents the sum of the inputs and the C output represents the carry from the summing of the inputs.

The two outputs from CSA 11 and the fourth partial product Z are inputted to CSA 12. The two outputs, C and S, from CSA 12 provide two numbers which is the reduction of the partial products of W, X, Y and Z. Therefore, in order to use the prior art circuit 10 to add four partial products, W, X, Y and Z, requires two carry-save adders 11 and 12. A carry-save adder typically uses two exclusive OR gates 13 and 14 to generate an S output.

FIG. 2 shows an architecture for a Wallace Tree structure to implement the reduction of sixteen partial products to two numbers that have the same sum and the sum of the sixteen partial products. Fifteen numbers $N_2-N_{16}$ are inputted three each into each of the five CSAs 15 shown in level 6. Level 5 is comprised of three CSAs 15 which receive the various C and S outputs from CSAs 15 of level 6 as shown in the drawing. However, because of the even number of C and S outputs at level 6, one of the C and S output from CSA 16 of level 6 (in this case the S output) is coupled to CSA 17 of level 3. The six outputs from the CSAs 15 of level 5 are coupled to the two CSAs 15 of level 4. Level 3 is comprised of two CSAs 15, wherein three of the outputs from level 4 are coupled to CSA 18 and the remaining output is coupled to CSA 17. As stated above, one of the outputs from CSA 16 is coupled to CSA 17.

Also coupled to CSA 17 as an input is the last partial product, $N_1$, which forms the third input to CSA 17. Level 2 is comprised of a single CSA 15, wherein three of the outputs from level 3 are coupled as an input to the CSA 15 of level 2. The fourth output from level 3 (shown as the output S from CSA 17), along with the two outputs from the CSA 15 of level 2 are coupled as inputs to CSA 15 of level 1. Finally, the S and C outputs from CSA 15 of level 1 provide the two numbers that have the sum as the sum of all of the sixteen partial products. These two numbers are provided as inputs to a carry propagation adder 19 which provides the third step of adding the two numbers derived from the reduction of the partial products.

In the reduction of sixteen numbers during the second step of the multiplication cycle, fourteen carry-save adders 15 are required in which these CSAs 15 are structured into 6 levels. It is also to be noted that each of the partial products, $N_1-N_{16}$, may be represented by m number of bits. The number of bits in each partial product determines the number of adder cells that are arranged in parallel to form CSA 15. One disadvantage of the structure shown in FIG. 2 is that it is difficult to layout on an integrated circuit because of the lack of regularity in the interconnections between carry save adders 15.

A variation of the Wallace Tree is shown in FIG. 3. The structure in FIG. 3 has more regular interconnections between adders and is therefore easier to layout on an integrated circuit. In the prior art, four-to-two adders 21 shown in FIG. 3 are comprised of two carry save adders 11 and 12 of FIG. 12.

Referring to FIG. 3, a prior art adder structure 20 is shown. The same sixteen partial products which were generated for input to the circuit of FIG. 2 is also provided and shown as $N_1-N_{16}$. The sixteen numbers are provided as inputs to the four adders comprising level 3 of structure 20. Four different inputs are provided to each adder 21 of level 3. Each adder provides two numbers (also designated C and S for convenience) which have the same sum as the sum of the four inputted partial products. The eight outputs from level 3 are coupled to the two adders 21 comprising level 2 and the four outputs from the two adders 21 of level 2 are coupled as inputs to the single adder 21 of level 1.

The C and S outputs from adder 23 of level 1 provide the two numbers that have the same sum as the sum of all of the partial products $N_1-N_{16}$. These two outputs from adder 23 are provided to a carry propagation adder 24 which provides the necessary third step for generating the final sum which is the product. It is to be noted that the generation of the partial products, as well as the use of carry propagation adders, which comprises steps 1 and 3 of the multiplication sequence, are well-known in the prior art.

PRESENT INVENTION

The present invention grew out of a need to provide a faster technique for performing multiplication in a processor. The present invention applies the prior art technique of performing a multiplication operation by the use of the above described three steps. As stated earlier, the first step is to generate all of the partial products substantially at the same time. The second step is to reduce all of the partial products to two numbers that have the same sum as the sum of the partial products. Finally, the third step is to use a carry propagating adder to add the two numbers derived from the second step to obtain the final product. The present invention addresses a faster technique to provide step two of the multiplication sequence, that is, reducing the partial products to two numbers that have the same sum as the sum of the partial products.

The present invention uses the Wallace Tree variation as exemplified in the structure 20 of FIG. 3. The present invention achieves increased speed by using a faster four-to-two adder than the dual three-to-two carry save adders of FIG. 1. Although it may appear that it would be readily easy to modify the circuit of FIG. 1, that is, combine CSAs 11 and 12 of FIG. 1 as a single adder, it is not apparent how to achieve this in a way that increases speed. The four-to-two adder of the present invention incorporates circuitry for improving the speed of reducing the four input numbers to C and S outputs.

Referring to FIG. 4, an expanded view of one of the four-to-two adders of present invention is shown. The number of cells in the four-to-two adder is determined by the number of bits in the four numbers it is adding. In FIG. 4, four 32-bit numbers are being added, so thirty-two adder cells 27 are required. These adder cells 27 are arranged in a row to provide parallel processing of each of the 32 bits of each group of four numbers, such as $N_{13}-N_{16}$. Each bit of the four numbers are inputted to corresponding adder cells 27. Also coupled to each of the adder cells 27 are three of the four input bits from the previous adder cell. The least significant adder cell will have three zeros to represent inputs from the previous cell. It is to be appreciated that the number of adder cells 27 will depend on the number of bits assigned to the numbers. Also the same arrangement of adder cells 27 are used for each of the other adders 21 of FIG. 3.

It is to be appreciated that the four-to-two adder of the present invention, although providing an output which represents two numbers that have the same sum as the sum of the partial products, is more than just placing an additional input to the prior art adder 15. The adder cells 27 have a different structure for improving the processing speed.

Referring to FIG. 5, a block diagram of the preferred embodiment for providing the adder cell 27 of FIG. 4 is shown. Bits of four numbers of the current bit stage are represented by $W_i$, $X_i$, $Y_i$ and $Z_i$, which are inputted to the four-bit parity circuit 31. The three bits from the previous stage designated as $W_{i-1}$, $X_{i-1}$, $Y_{i-1}$, are coupled as inputs to a carry generator circuit 32. The carry generator 32 adds its three inputs and outputs a signal C'/ which represents the complement of the carry out of the addition of the three input signals to carry generator 32 (/is hereinafter used to designate a complement). The equation for determining C' is:

$$C' = (W_{i-1} \cdot X_{i-1}) + (W_{i-1}) + (X_{i-1} \cdot Y_{i-1}) \quad \text{(Equation 1)}$$

The parity circuit 31 generates an output P which is the result of exclusive OR'ing the four inputs. The equation for determining P is:

$$P + W_i \oplus X_i \oplus Y_i \oplus Z_i \quad \text{(Equation 2)}$$

The C'/ signal is coupled as one input to a multiplexer (MUX) 35 and is also coupled to the other input of MUX 35 through invertor 36. The output of invertor 36 is also coupled as a first input to MUX 33. The input $Z_i$ is coupled as a second input to MUX 33. Therefore, MUX 35 selects between C' and its complement C'/, while MUX 33 selects between Zi and C'. The control signal for selecting which output is to be selected from both MUXs 33 and 35 is determined by the signal P, which is the output from the parity circuit 31. The output of MUX 35 provides the $sum_i$ (S) signal while the output of MUX 33 provides the $carry_{i+1}$ (C) signal. The equation for determining the $sum_i$ and $carry_{i+1}$ are:

$$sum_j = C' \oplus P \quad \text{(Equation 3)}$$
$$= (C' \cdot P/) + (C'/ \cdot P)$$
$$carr_{i+1} = (Zi \cdot P/) + (C' \cdot P) \quad \text{(Equation 4)}$$

The truth table for determining the outputs S and C from adder cell 27 is equivalent to the outputs S and C, sum and carry, from CSA 12 of the two stage carry-save adder circuit 10 of FIG. 1. Therefore, the final outputs from adder cell 27 is equivalent to the outputs from the prior art circuit 10 of FIG. 1. It is to be noted that the one input which is not coupled to the subsequent stage, Z in this example, must be used as the input to MUX 33.

Referring to FIG. 6, one circuit diagram to provide the adder cell 27 of the present invention is shown. Z'hd i is coupled to MUX 33 as was shown in FIG. 5. The four-bit parity circuit 31 is comprised of three exclusive OR gates 41, 42 and 43. $W_i$ and $X_i$ inputs are coupled as inputs to exclusive OR gate 41, while $Z_i$ and $Y_i$ inputs are coupled as inputs to exclusive OR gate 42. The outputs of the exclusive OR gates 41 and 42 are further coupled as inputs to a third exclusive OR gate 43 which output provides the signal P.

It should be noticed that exclusive OR gates 41 and 42 can operate in parallel, unlike the two exclusive OR gates in the prior art carry save adders of FIG. 1. The 3-bit parity circuit used to derive the sum output of a conventional carry save adder, such as CSA 11 of FIG. 1, and the 4-bit parity circuit used in the present invention both take two exclusive OR gate delays to evaluate.

Then, P/ is derived through invertor 44. One representative circuit for providing the exclusive OR gates 41, 42 and 43 is shown in the expanded diagram within circle 45. It is to be appreciated that FIG. 6 designates a complementary-metal-oxide-semiconductor (CMOS) circuit implementation of FIG. 5. The carry generator 32 is implemented by five p-type devices and five n-type devices coupled as shown in FIG. 6 for the generation of the signal C'/. This circuit representation of carry generator circuit 32 is well-known in the prior art. In the preferred embodiment, MUX 35 is implemented by CMOS circuits 46, 47 and inverter 37 while MUX 33 is implemented by CMOS circuits 48, 49 and invertor 38. A further circuit representation of each of circuit 46–49 is shown in the expanded diagram within circuit 50. Each of the circuits 46 through 49 is comprised of two p-type devices and two n-type devices arranged in a stock with the gates of the outermost n- and p-type devices coupled together. The remaining gates are driven by either P or P/signal as shown in FIG. 6. For circuit 46, P is coupled to the gate of its n-type device while P/ is coupled to the gate of the p-type device. For circuit 47, P is coupled to the gates of the p-type device while P/ is coupled to the gate of the n-type device. For circuit 48, P is coupled to the gate of the n-type device while P/ is coupled to the gate of the p-type device. For circuit 49, P is coupled to the gate of the p-type device, while P/ is coupled to the gate of the n-type device. The circuits of FIGS. 5 and 6 provide the final outputs $sum_i$ and $carry_{i+1}$ determined by Equations 3 and 4.

By using the four-bit parity circuit 31 to control the two MUXs 33 and 35 to generate the S and C for a four-to-two conversion, speed is improved compared to the prior art circuit of FIG. 1. For example, in the prior art circuit of FIG. 1, the final sum is generated by the use of two carry-save adders 11 and 12, each employing two exclusive OR gates 13 and 14, or a total of four levels of exclusive OR gates. The present invention as shown in the schematic of FIG. 6 will generate the same sum by the use of two levels of exclusive OR gates and a MUX.

The carry output, $carry_{i+1}$, of the present invention is also computed faster than the carry output of the prior art circuit of FIG. 1. In the prior art circuit of FIG. 1, two levels of exclusive ORs in CSA 11 and a carry generator circuit in CSA 12 must evaluate their respective inputs before the $carry_{i+1}$ output becomes valid. In the present invention, the $carry_{i+1}$ output is valid after two levels of exclusive ORs in parity circuit 31 and the delay of a two-to-one MUX. The $carry_{i+1}$ output of the present invention is faster than the prior art circuit of FIG. 1, because the delay of a two-to-one MUX is less than the delay of a carry generator circuit.

It is to be appreciated that although a particular embodiment is described, various other circuits are available to practice the present invention. Further, the present invention is implemented on a single semiconductor device which is used as a numerical processor, however, such requirements not being a limitation to the practice of the present invention.

Thus, a four-to-two adder is described.

We claim:

1. An adder circuit for receiving four input numbers and generating two output numbers that when summed equals the summation of said four input numbers, comprising:
    a plurality of adder cells arranged in parallel, each said adder cell for adding corresponding bits of said four inputted numbers, said adder cell comprising:
    (i) a carry generator circuit coupled to accept three of four corresponding bits from its previous adder cell and coupled to provide an intermediate carry output as a first input to a first multiplexer (MUX) and a complement of said intermediate carry output as a second input to said first MUX;
    (ii) a parity circuit coupled to accept said four corresponding bits of said input numbers for generating a control signal determined by a parity comparison of said four corresponding bits;
    (iii) one of said four corresponding bits which corresponds to a number not coupled to receive a bit from its previous adder cell being coupled as a first input to a second MUX and said complement of said intermediate carry output being coupled as a second input to said second MUX; and
    (iv) said control signal selecting between said first and second inputs to said first MUX for determining one of said two output numbers and said control signal also selecting between said first and second inputs to said second MUX for determining other of said two output numbers.

2. The adder circuit of claim 1, wherein said circuit is implemented using complementary-metal-oxide-semiconductor technology.

3. In a multiplication scheme having a first step for generating all partial products of two numbers being multiplied, having a second step of reducing said partial products to two numbers that when summed equals the summation of the partial products, and a third step of adding said two numbers from said second step to determine the final product, an adder circuit for determining said second step of reducing partial products to two numbers comprising:
    a plurality of adders arranged in a structure having a plurality of levels, wherein adders of an upper most level accept numbers representing said partial products and having a first and second output to adders located at a next lower lever, and adders on subsequent lower levels accepting said first and second outputs from said adders of next higher level and providing further first and second outputs to adders of next lower level until a final adder at a lowest level provides its first and second outputs which are said two numbers that when summed equals the summation of said partial products;
    each said adder being comprised of a plurality of adder cells arranged in parallel, each said adder cell accepting one corresponding bit of each of four numbers to be added, and also coupled to provide three of said bits to subsequent adder cells of next significant bit position;
    each said adder cell including;
    (i) a carry generator circuit coupled to accept said three bits from its previous adder cell and generating a carry of said three bits;
    (ii) a first multiplexer (MUX) coupled to accept said carry as its first input and a complement of said carry as its second input;
    (iii) a parity circuit coupled to accept said four bits and generating a parity signal as a parity of said four inputs;
    (iv) a second MUX coupled to accept one of said four bits not coupled to subsequent adder cell as a first input to said second MUX, and said carry as a second input to said second MUX;
    (v) said parity control signal being coupled to said first and second MUXs for selecting between the inputs of said first MUX and also selecting between the inputs of said second MUX;
    wherein output of said first MUX and output of said second MUX provide said first and second outputs to adders on said next lower level, respectively.

4. The adder circuit of claim 3, wherein said circuit is implemented using complement-metal-oxide semiconductor technology.

5. An adder circuit for receiving four input numbers and generating two output numbers that when summed equals the summation of said four input numbers, comprising:
    a plurality of adder cells arranged in parallel each said adder cell for adding corresponding bits of said four inputted, numbers, said adder cell comprising:
    (i) parity checking means coupled to receive said four corresponding bits for generating a control signal determined by a parity of said four corresponding bits;
    (ii) first selector means coupled to receive a carry of any three corresponding next lesser significant bits as its first input and to receive a complement of said carry of any three corresponding next lesser significant bits as its second input;
    (iii) second selector means coupled to receive one of said four corresponding bits which corresponds to a number not used in receiving a carry by said first selector means as its first input and to receive a complement of said carry of any three corresponding next lesser significant bits as its second input;
    (iv) said control signal selecting between said first and second inputs to said first selector means for determining one of said two output numbers; and,
    (v) said control signal also selecting between said first and second inputs to said second selector means for determining other of said two output numbers.

* * * * *

UNITED STATES PATENT AND TRADEMARK OFFICE
CERTIFICATE OF CORRECTION

PATENT NO. : 4,901,270
DATED : 2/13/90
INVENTOR(S) : Galbi et al.

It is certified that error in the above-identified patent and that said Letters Patent is hereby corrected as shown below:

| | | |
|---|---|---|
| col. 01, line 34 | delete "variation" | insert --variations-- |
| col. 02, line 15 | delete "adders" | insert --adder-- |
| col. 02, line 27 | delete "multiplexer" | insert --multiplexers-- |
| col. 05, line 25(Equation 1) | delete "$(W_{i-j})$" | insert --$(W_{i-1} \cdot Y_{i-j})$-- |
| col. 05, line 31(Equation 2) | delete "+" | insert -- = -- |
| col. 05, line 47(Equation 3) | delete "$sum_j$" | insert --$sum_i$-- |
| col. 05, line 51(Equation 4) | delete "$carr_{i-1}$" | insert --$carry_{i+1}$-- |
| col. 06, line 28 | delete "stock" | insert --stack-- |

Signed and Sealed this

Twentieth Day of August, 1991

*Attest:*

HARRY F. MANBECK, JR.

*Attesting Officer*  *Commissioner of Patents and Trademarks*